US010166737B2

(12) United States Patent
Kwon et al.

(10) Patent No.: US 10,166,737 B2
(45) Date of Patent: Jan. 1, 2019

(54) LOAD FLOOR HAVING SOUND ABSORPTION AND INSULATION PERFORMANCES FOR VEHICLE

(71) Applicant: DAESOL AUSYS CO., LTD., Incheon (KR)

(72) Inventors: Min Ho Kwon, Seoul (KR); Ma Byung-Jong, Gyeonggi-do (KR)

(73) Assignee: DAESOL AUSYS CO., LTD., Incheon (KR)

( * ) Notice: Subject to any disclaimer, the term of this patent is extended or adjusted under 35 U.S.C. 154(b) by 54 days.

(21) Appl. No.: 15/412,242

(22) Filed: Jan. 23, 2017

(65) Prior Publication Data

US 2017/0225425 A1 Aug. 10, 2017

(30) Foreign Application Priority Data

Feb. 5, 2016 (KR) ........................ 10-2016-0014796

(51) Int. Cl.

| | |
|---|---|
| ***B62D 33/00*** | (2006.01) |
| ***B32B 3/12*** | (2006.01) |
| ***B32B 3/26*** | (2006.01) |
| ***B32B 27/40*** | (2006.01) |
| ***B60R 13/01*** | (2006.01) |
| ***B60N 3/04*** | (2006.01) |

(Continued)

(52) U.S. Cl.

CPC ................ *B32B 3/12* (2013.01); *B32B 3/266* (2013.01); *B32B 5/028* (2013.01); *B32B 7/12* (2013.01); *B32B 27/10* (2013.01); *B32B 27/12* (2013.01); *B32B 27/40* (2013.01); *B32B 29/02* (2013.01); *B32B 29/08* (2013.01); *B60N 3/04* (2013.01); *B60R 13/011* (2013.01); *B32B 2250/40* (2013.01); *B32B 2262/101* (2013.01); *B32B 2307/102* (2013.01); *B32B 2307/732* (2013.01); *B32B 2309/105* (2013.01); *B32B 2605/00* (2013.01); *B32B 2607/00* (2013.01); *B60Y 2306/09* (2013.01)

(58) Field of Classification Search

CPC .............. B29C 66/71; B32B 2262/101; B32B 2262/106; B32B 3/12; B32B 7/12; B60R 5/04; B60R 5/044; B62D 25/20; Y10S 292/31; Y10T 292/1047

USPC ........... 296/39.3; 117/117, 95, 116; 52/794.1

See application file for complete search history.

(56) References Cited

U.S. PATENT DOCUMENTS 3,616,118 A * 10/1971 Porter ................ A47G 27/0206 428/174

4,685,259 A * 8/1987 Eberhart ................ E04F 15/18 428/118

(Continued)

FOREIGN PATENT DOCUMENTS

KR 0591531 B1 6/2006

KR 10-2006-0113097 A 11/2006

*Primary Examiner* — Kiran B Patel

(74) *Attorney, Agent, or Firm* — Bacon & Thomas, PLLC

(57) ABSTRACT

A load floor for a vehicle, by which, as the load floor is manufactured by including manufacturing a honeycomb structure with paper and adding polyurethane sheets to both side surfaces of the honeycomb structure, light and sufficient structural stiffness and a sound absorption effect are obtained through the honeycomb structure. As the polyurethane sheets are respectively provided on both surfaces of the honeycomb structure, sound absorption and insulation performances are obtained to further increase a sound absorption and insulation effect.

6 Claims, 7 Drawing Sheets

(51) Int. Cl.

| | |
|---|---|
| ***B32B 5/02*** | (2006.01) |
| ***B32B 7/12*** | (2006.01) |
| ***B32B 27/10*** | (2006.01) |
| ***B32B 27/12*** | (2006.01) |
| ***B32B 29/02*** | (2006.01) |
| ***B32B 29/08*** | (2006.01) |

(56) References Cited

U.S. PATENT DOCUMENTS 4,946,721 A * 8/1990 Kindervater .......... B29C 70/202 138/123
5,269,219 A * 12/1993 Juvik-Woods ..... B65D 19/0016 108/51.3
5,830,548 A * 11/1998 Andersen .................. B28B 1/00 206/524.3
5,843,558 A * 12/1998 Yoshizaki ............. B29C 70/207 428/112
6,099,680 A * 8/2000 Harris .................. B29D 24/005 156/279
6,537,413 B1 * 3/2003 Hochet ................. B29C 70/088 156/297
6,753,061 B1 * 6/2004 Wedi ......................... B32B 3/12 428/73
6,793,747 B2 * 9/2004 North .................... B29C 70/506 156/308.2
7,264,685 B2 * 9/2007 Katz ......................... B32B 5/26 156/60
7,320,739 B2 * 1/2008 Thompson, Jr. .......... B32B 5/02 156/196
7,837,009 B2 * 11/2010 Gross ...................... B32B 27/12 181/208
7,918,313 B2 * 4/2011 Gross ....................... D04H 1/64 181/284
7,919,031 B2 * 4/2011 Winget ............... B29C 45/0053 249/64
8,156,710 B1 * 4/2012 Pien ...................... E04F 15/105 52/177
8,622,456 B2 * 1/2014 Preisler ................. B60R 13/013 296/193.07
8,690,233 B2 * 4/2014 Preisler ..................... B60R 5/04 296/193.07
8,800,245 B1 * 8/2014 Pien .................. E04F 15/02172 428/411.1
8,808,833 B2 * 8/2014 Preisler ..................... B32B 5/26 296/39.1
8,834,985 B2 * 9/2014 Preisler ................... B32B 3/263 296/39.1
9,346,375 B2 * 5/2016 Preisler ..................... B32B 7/12
9,399,435 B2 * 7/2016 Preisler ..................... B32B 7/12
9,527,268 B2 * 12/2016 Preisler ................. B32B 27/065
9,539,958 B2 * 1/2017 Preisler ................. B60R 13/011
9,567,037 B2 * 2/2017 Preisler ..................... B63B 9/06
9,707,725 B2 * 7/2017 Preisler ................... B29C 70/46
9,770,849 B2 * 9/2017 Preisler ................... B29C 43/18
2002/0002937 A1 * 1/2002 Modesitt ............ B65D 19/0002 108/57.34
2004/0037995 A1 * 2/2004 Nicolai .................. B60N 3/048 428/95
2006/0141260 A1 * 6/2006 Hague ....................... B32B 5/02 428/412
2007/0054087 A1 * 3/2007 Smith ....................... B32B 3/12 428/116
2008/0010943 A1 * 1/2008 Marschke ............. E01D 19/125 52/793.1
2009/0068906 A1 * 3/2009 Kawano ................. A45C 3/001 442/16
2009/0155520 A1 * 6/2009 Roers .................. D06N 7/0086 428/95
2009/0214818 A1 * 8/2009 Levit ......................... B32B 3/12 428/116
2011/0315310 A1 * 12/2011 Trevisan ................. B29C 70/68 156/245
2013/0278002 A1 * 10/2013 Preisler ..................... B32B 3/12 296/37.5
2013/0278003 A1 * 10/2013 Preisler ..................... B60R 5/00 296/37.5
2013/0278009 A1 * 10/2013 Preisler ............... B60R 13/0275 296/97.23
2013/0278015 A1 * 10/2013 Preisler ............... B60R 13/0237 296/191
2013/0278018 A1 * 10/2013 Preisler .................. B62D 25/20 296/193.07
2013/0278019 A1 * 10/2013 Preisler ..................... B60R 5/04 296/193.07
2013/0278020 A1 * 10/2013 Preisler .................. B62D 25/20 296/193.07
2013/0280472 A1 * 10/2013 Preisler ..................... B32B 3/28 428/95
2013/0280473 A1 * 10/2013 Preisler ................. B60R 13/011 428/95
2014/0077518 A1 * 3/2014 Preisler ................ B60N 2/6009 296/37.5
2014/0077530 A1 * 3/2014 Preisler ................ B60N 2/6009 296/193.07
2014/0077531 A1 * 3/2014 Preisler .................... B60N 2/60 296/193.07
2014/0145465 A1 * 5/2014 Preisler ..................... B32B 3/12 296/37.5
2014/0145470 A1 * 5/2014 Preisler .................. B62D 29/04 296/193.07
2014/0147622 A1 * 5/2014 Preisler ................... B29C 43/00 428/116
2015/0090526 A1 * 4/2015 Sasaki ....................... E04B 1/86 181/294
2015/0130220 A1 * 5/2015 Preisler ..................... B32B 7/12 296/193.07
2016/0251800 A1 * 9/2016 Rose ....................... B32B 5/022 442/64

* cited by examiner

LOAD FLOOR HAVING SOUND ABSORPTION AND INSULATION PERFORMANCES FOR VEHICLE

CROSS-REFERENCE TO RELATED APPLICATION

This application claims priority to and the benefit of Korean Patent Application No. 10-2016-0014796, filed on Feb. 5, 2016, the disclosure of which is incorporated herein by reference in its entirety.

BACKGROUND

The present invention relates to a load floor to be installed in a trunk, and more particularly, to a load floor by which effects of structural stiffness, weight loss, and sound absorption are obtained using a honeycomb structure manufactured with paper, and particularly a sound insulation effect is obtained by attaching hard polyurethane sheets to both sides of the honeycomb structure, and a sound absorption performance for a specific frequency band is improved by punching any one polyurethane sheet.

Generally, a vehicle includes a trunk (T) to load luggage as illustrated in FIG. 1. The trunk is generally formed behind a passenger compartment and a user opens a trunk lid to load luggage. Although the trunk is conventionally manufactured as a space completely separated from the passenger compartment, the trunk may also recently manufactured to be open to the passenger compartment so as to load long leisure equipment, such as skis, as the occasion demands. In addition, the trunk includes a load floor (L) to load luggage as described above. The load floor is manufactured in various shapes such as a sheet form laid on a bottom of the trunk (T) or a block shape, in which luggage can be separately stored, and is manufactured in various structures as disclosed in below patent documents 1 and 2.

(Patent Document 1) Korean Patent Registration No. 0591531

This invention relates to a folding load floor for a vehicle, and the load floor is rotatably installed behind a rear seat behind which a cargo space is formed, rotates downward to provide a flat supporting surface spaced a predetermined height from a bottom plate of the cargo space as necessary, and includes: a supporting board which rotates upward to be in contact with a seat back, rotates downward to provide the supporting surface, and has a predetermined area; and a connecting portion fixed to one end portion of the supporting board and configured to rotatably connect the supporting board with respect to the rear seat. The folding load floor for a vehicle formed as described above is unfolded backward to provide the supporting surface in a state of being installed behind the rear seat if needed, and particularly, since the height of the unfolded load floor is the same as that of a top surface of a seatback folded forward, an overall bottom surface of a cargo space extended by folding the seatback forward in a vehicle becomes even without steps, and convenience in use of the cargo space is improved.

(Patent Document 2) Korean Laid-open Patent Application No. 10-2006-0113097

This invention relates to a load floor system for a vehicle. The load floor system corresponding to folding of a divided seatback is applied in a luggage room of a vehicle to use the luggage room as a cargo storage space when a seatback is unfolded and to use the luggage room as an even cargo loading space when the seatback is folded, and thus user convenience in use and a commercial value of the vehicle is maximized.

However, such conventional load floors have the following problems.

(1) The conventional load floor is manufactured with a reinforced natural fiber board or manufactured by injection-molding a polypropylene (PP) in many cases.

(2) The load floor manufactured with the natural fiber or the PP as described above is heavy itself, and since a finished end portion of the load floor is not smooth, aesthetics thereof is not good or a finishing treatment has to be performed.

(3) Particularly, when the weight of the load floor itself is heavy, the weight of a vehicle increases, and thus the heavy weight becomes one factor of reducing a fuel efficiency of the vehicle.

(4) In addition, in the conventional load floor, although a sound insulation effect may be conventionally obtained to a certain extent, a sound absorption performance is lowered. Particularly, when a trunk and a passenger compartment communicate with each other for loading skis, noise, vibration, or the like in the trunk is directly transferred to the passenger compartment without interruption.

(5) Accordingly, there is a risk in that pleasant indoor environment can be ruined due to dust or noise which comes into an indoor space through the trunk from the outside of a vehicle.

Patent Document 1: Korean Patent Registration No. 0591531 (Registration Date: Jun. 13, 2006)

Patent Document 2: Korean Laid-open Patent Application No. 10-2006-0113097 (Laid-open Date: Nov. 2, 2006)

SUMMARY OF THE INVENTION

The present invention is directed to providing a load floor for a vehicle, by which, as the load floor is manufactured by including manufacturing a honeycomb structure with paper and adding polyurethane sheets to both side surfaces of the honeycomb structure, a sound absorption effect may be obtained in addition to obtaining light and sufficient structural stiffness and, as the polyurethane sheets are respectively provided on both surfaces of the honeycomb structure, sound absorption and insulation performances are obtained to further increase a sound absorption and insulation effect.

In addition, the present invention is also directed to providing a load floor for a vehicle, by which, as a plurality of punched holes are formed in at least one of two polyurethane sheets, outside noise that comes from the outside of the vehicle is insulated by the polyurethane sheet in which the punched holes are not formed, and sound is absorbed by the polyurethane sheet in which the punched holes are formed and a honeycomb structure so as to improve sound absorption and insulation performances.

Particularly, the present invention is also directed to providing a load floor for a vehicle, by which, as noise of a specific frequency band that comes into a trunk from the outside of the trunk and is different according to a model of a vehicle is removed through changing the number of, gaps between, and diameters of punched holes, sound absorption and insulation performances are obtained to obtain an optimally improved noise performance according to the model of a vehicle.

According to an aspect of the present invention, there is provided a load floor having sound absorption and insulation performances for a vehicle, including: a honeycomb structure (10) manufactured in a sheet form; two glass mesh mats (20) respectively installed on both side surfaces of the honeycomb structure (10); polyurethane sheets (30) formed of a hard material and respectively provided to overlap the glass mesh mats (20); and two wall papers (40) respectively provided to overlap the polyurethane sheets (30).

Particularly, the honeycomb structure (10) may be manufactured with paper.

In addition, punched holes (31) having a predetermined gap may be formed in at least one of the polyurethane sheets (30), wherein the punched hole (31) may have a diameter in a range of 2 to 4 mm.

In addition, the load floor may have a total thickness in a range of 13 to 25 mm, and each of the polyurethane sheets (30) may have a thickness in a range of 2 to 3 mm.

Last, the load floor may be used by being installed on a trunk floor panel or include a package tray installed to be spaced a predetermined gap from the floor panel and configured to put luggage thereon.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF THE INVENTION

Hereinafter, an exemplary embodiment of the present invention will be described in more detail with reference to the accompanying drawings. Moreover, terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

(Structure)

Figure 2:
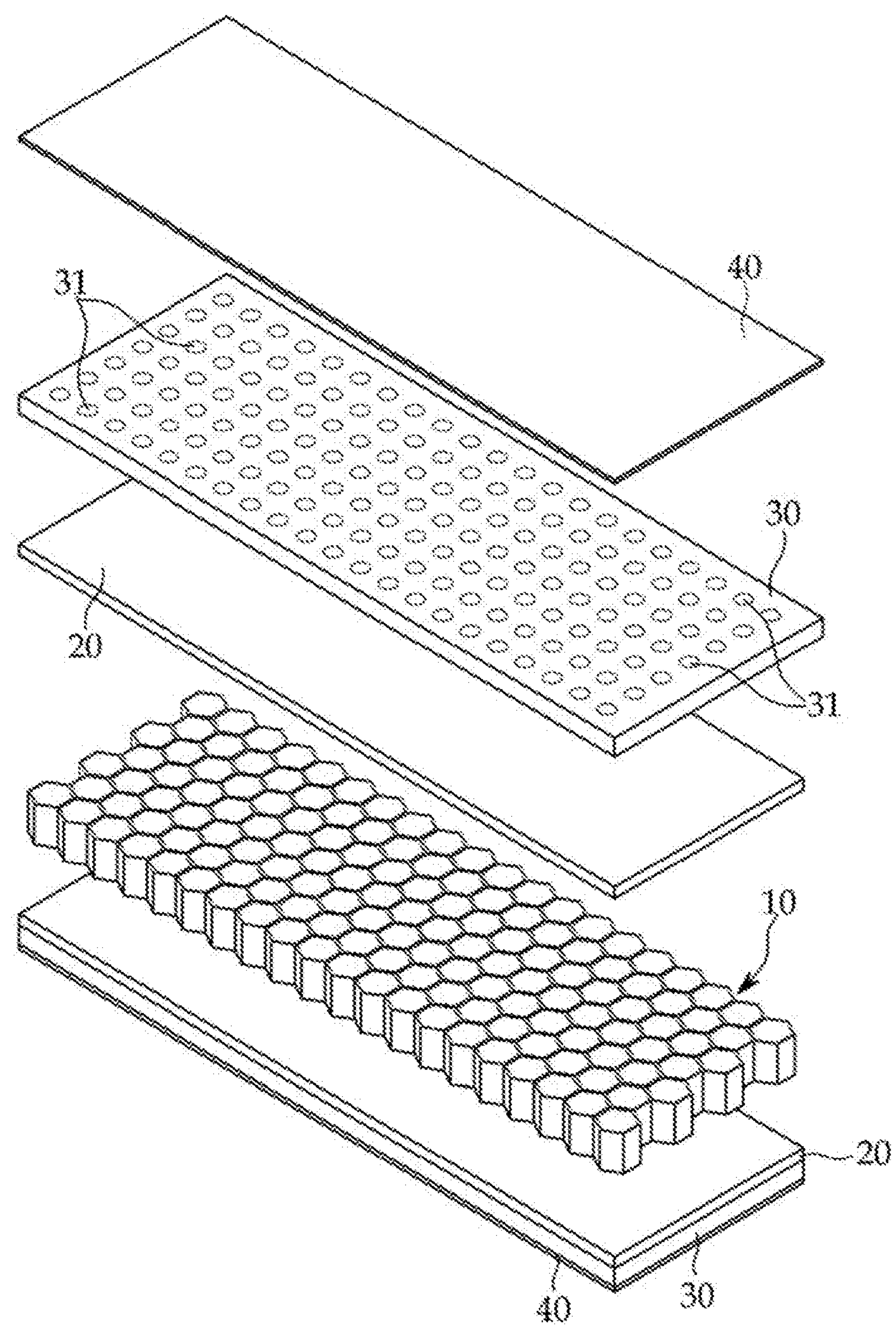
FIG. 2 is an exploded perspective view illustrating a part of a load floor for showing a structure of the load floor according to the present invention.
Figure 3:
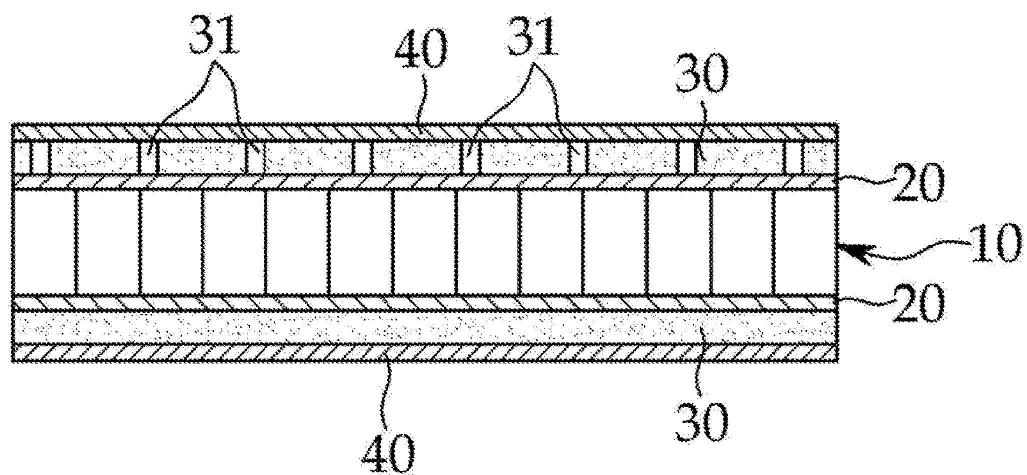
FIG. 3 is a cross-sectional view illustrating the structure of the load floor according to the present invention.

A load floor for a vehicle having sound absorption and insulation performances according to the present invention is formed by sequentially stacking and integrally attaching a glass mesh mat 20, a polyurethane sheet 30, and a wall paper 40 on and to each of both surfaces of a honeycomb structure 10 as illustrated in FIGS. 2 and 3.

Particularly, the honeycomb structure 10 may reduce noise in addition to reducing the total weight of the load floor by manufacturing the honeycomb structure 10 using paper, and further increase an effect of reducing noise through such a sound absorption effect of the polyurethane sheet 30.

In addition, as punched holes 31 having a predetermined gap are formed in one of the polyurethane sheets 30, noise of a different specific band is reduced according to diameters of the punched holes 31, and thus holes may be punched and used to correspond to noise different according to a vehicle.

Figure 1:
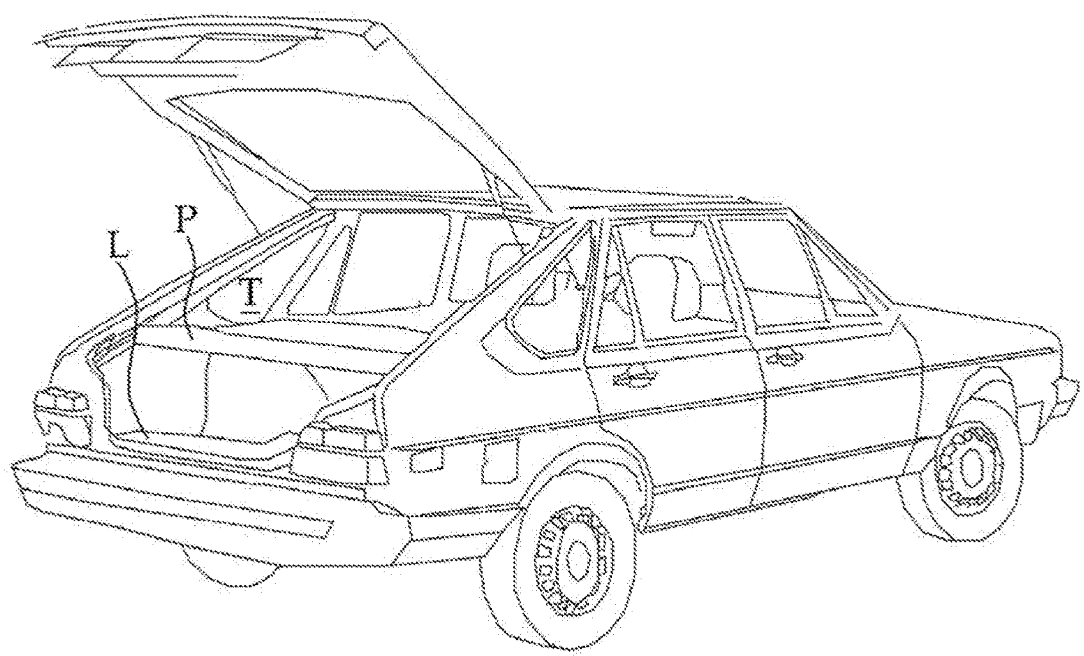
FIG. 1 is a perspective view illustrating a part of a vehicle for showing a trunk of a conventional vehicle.

Hereinafter, the above-described structure will be described in more detail below. Here, the load floor according to the present invention includes a board L laid on a bottom of a trunk T in a sheet form or a package tray P installed in the trunk T to be spaced a predetermined gap from a trunk floor panel as illustrated in FIG. 1.

As illustrated in FIGS. 2 and 3, the honeycomb structure 10 is formed in a structure in which hollow hexagonal pillars having open both surfaces are continuously in contact with each other. Such a structure may expect effects of reducing noise passing through the open both surfaces in addition to increasing structural stiffness thereof.

Particularly, it is preferable that the honeycomb structure 10 be formed to reinforce a structural stiffness, to improve a sound absorption, and to reduce a total weight of the load floor according to the present invention by manufacturing in a sheet form using paper. In addition, with such a reduction of weight, a weight reduction effect of about 1 to 1.6 $kg/m^2$ may be expected as compared to the load floor manufactured with a conventional PP.

Figure 4:
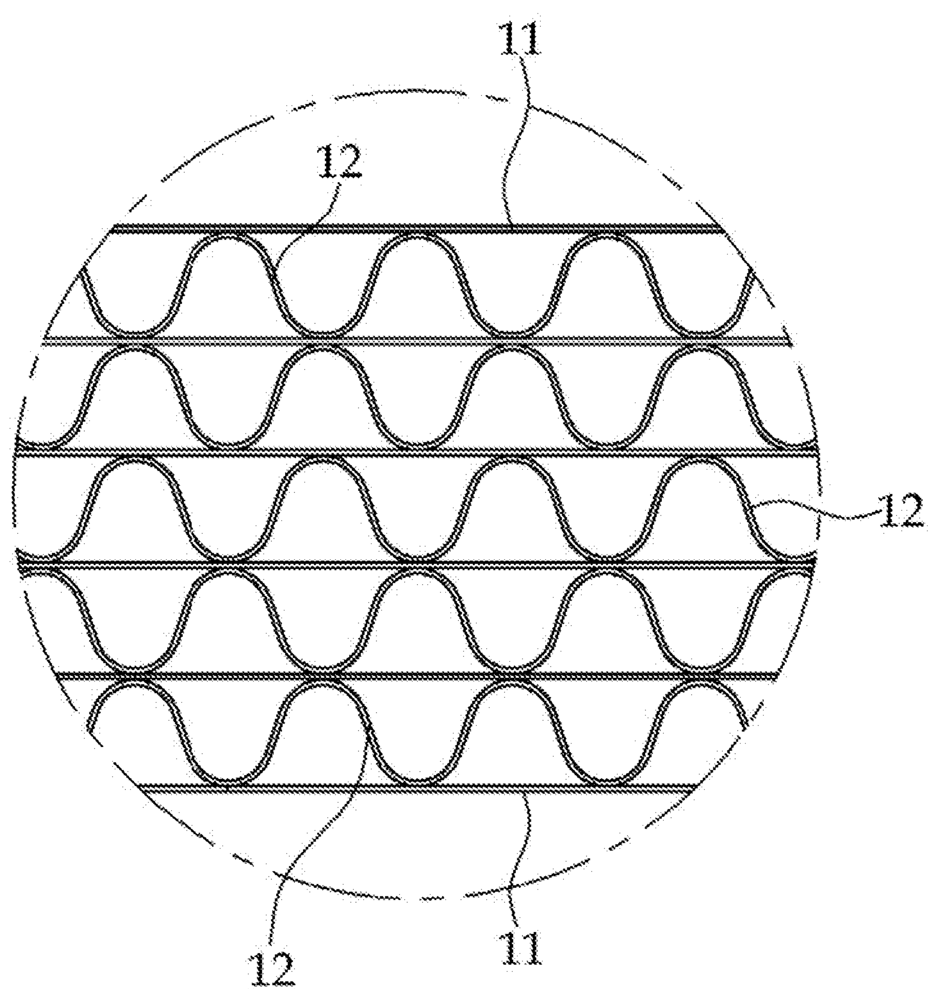
FIG. 4 is a partially enlarged view illustrating a different shape of a honeycomb structure according to the present invention.

In the exemplary embodiment of the present invention, the honeycomb structure 10 may be manufactured in a shape in which a hexagonal pillar is continuously and repeatedly formed as illustrated in FIG. 2, or a regular hexagonal pillar, a polygonal pillar, or a regular polygonal pillar is also continuously and repeatedly formed. In addition, as illustrated in FIG. 4, the honeycomb structure 10 may be formed in a corrugated cardboard form in which a corrugating medium 12 is inserted between two liners 11. Here, the liner 11 is formed in a plane shape, and the corrugating medium 12 is formed in a shape in which a wave is repeatedly formed.

As illustrated in FIGS. 2 and 3, the glass mesh mat 20 is formed by being stacked on each side of the honeycomb structure 10. The glass mesh mat 20 is formed with glass fiber in a mesh shape, allows the load floor according to the present invention not to be easily torn or broken like cloth, allows an overall shape of the load floor to be maintained when the shape is formed, and allows a complex shape to be easily formed.

As illustrated in FIGS. 2 and 3, the polyurethane sheet 30 is formed to be in contact with the glass mesh mat 20. Here, although the polyurethane sheet 30 may also be manufactured as a separated sheet and attached to the glass mesh mat 20, the polyurethane sheet 30 may also be integrally manufactured with the glass mesh mat 20 by directly foaming polyurethane on the glass mesh mat 20.

Such a polyurethane sheet 30 is configured to basically obtain a sound insulation performance using hard polyurethane. In addition, the polyurethane sheet 30 may be attached to each of two glass mesh mats 20 to improve the sound insulation performance for noise passing through the load floor according to the present invention. That is, sound is insulated by two polyurethane sheets 30 and is absorbed while passing through the honeycomb structure 10.

In the exemplary embodiment of the present invention, it is preferable that the punched holes 31 be further formed to have a predetermined gap in at least one of two polyurethane sheets 30. The punched holes 31 are for improving a sound absorption effect by passing the noise through the punched holes while the noise is transmitted. Particularly, since a frequency band of absorbed noise varies according to the diameter of the punched hole 31, a sound absorption effect is obtained by reducing a noise of a specific frequency band such as a noise of a low frequency band among noises passing through the trunk of a vehicle in which the load floor according to the present invention is installed. Accordingly, it is preferable that the diameter of the punched hole 31 according to the present invention be formed in a range of 2 to 4 mm to remove a specific frequency band according to a vehicle model. In addition, for the number of and positions of the punched holes 31, those skilled in the art may easily know that a suitable number of the punched holes 31 with a gap are formed at positions where big noise is expected to occur. Accordingly, in the present invention, noise that comes from the outside of a vehicle is insulated by the hard polyurethane sheet 30 in which the punched holes 31 are not formed, and noise is absorbed while passing through the honeycomb structure 10 and the hard polyurethane sheet 30 in which the punched holes 31 are formed.

In addition, in the exemplary embodiment of the present invention, it is preferable that the polyurethane sheet 30 be manufactured to have a thickness in a range of 2 to 3 mm. Although a sound absorption and insulation effect may be improved as the thickness increases, fuel efficiency may be degraded by increasing the weight of the load board. Thus, the sound absorption and insulation effect for a weight of the load floor may be improved by having the thickness of the polyurethane sheet 30 in the range of 2 to 3 mm.

As illustrated in FIGS. 2 and 3, each of the wall papers 40 is for finishing an exterior by attaching to the polyurethane sheet 30. Such a wall paper 40 may include a finishing material used in the art to which the present invention belongs, for instance, non-woven fabric, leather, artificial leather, and liner.

Such a wall paper 40 may be attached using various methods according to materials. For example, it is preferable that the wall paper 40 be attached to the polyurethane sheet 30 by spraying an adhesive using a spraying method. In addition, it is preferable that nap be formed on a surface of the wall paper 40 that is exposed to an interior of the trunk, and nap not be formed on a surface of the wall paper 40 facing the bottom of the truck. Thus, when the load floor according to the present invention is installed on the bottom of the truck, the surface of the wall paper having no nap may increase a gripping force with the bottom of the trunk and the surface of the wall paper having the nap may provide good touch sensation when a hand touches the wall paper.

Meanwhile, although the above-described glass mesh mat 20, the polyurethane sheet 30, and the wall paper 40 may also be provided on only one side surface of the honeycomb structure 10, preferably provided on both side surfaces thereof as illustrated in FIGS. 2 and 3.

In addition, it is preferable that the load floor according to the present invention be manufactured to have a total thickness in a range of 13 to 25 mm. This is because utilization of a space may be increased by minimizing a space occupied by the load floor in a limited space of the trunk and a structural stiffness and a sound absorption and insulation effect necessary for the load floor may be obtained.

Figure 5:
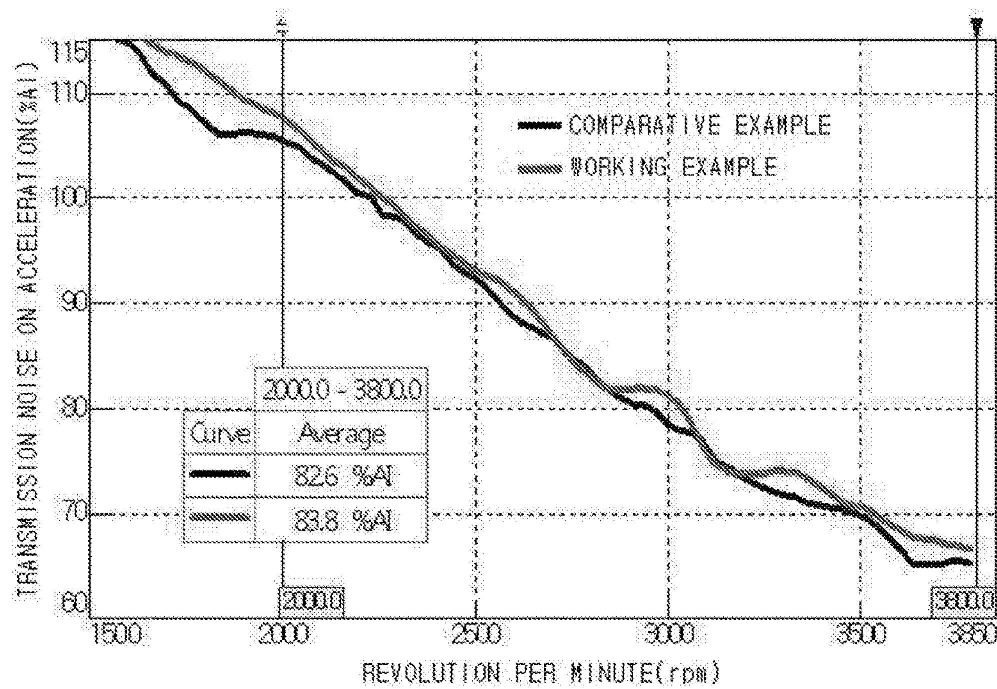
FIG. 5 is a graph for showing a transmission noise on acceleration (% AI) measured at a driver's seat when the load floor according to the present invention is installed in a vehicle.
Figure 6:
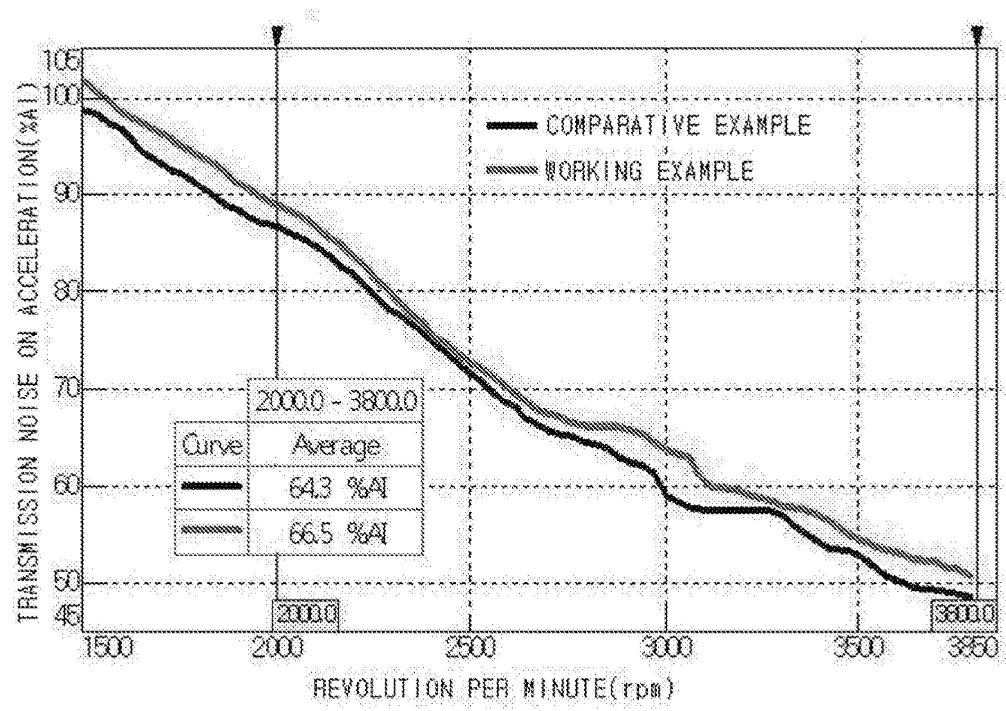
FIG. 6 is a graph for showing a transmission noise on acceleration (% AI) measured at a passenger seat when the load floor according to the present invention is installed in the vehicle.

Measurement results of transmission noise on acceleration (% AI) according to revolution per minute (RPM) for the load floor formed as described above according to the present invention (Working Example) and a load floor manufactured with a conventional PP (Comparative Example) are shown in FIGS. 5 and 6. Here, FIG. 5 is a graph showing measurement results measured at a driver's seat, FIG. 6 is a graph showing measurement results measured at a passenger seat, an x-axis denotes RPM of an engine, and y-axis denotes transmission noise on acceleration (% AI). In addition, the punched holes in Working Example are formed to have a diameter of 3 mm by being completely punched.

As a result, as shown in FIG. 5, average transmission noise on acceleration (% AI) at a driver's seat is 83.8% AI in Working Example and 82.6% AI in Comparative Example in an RPM interval ranging from 2,000 to 3,800 rpm, and thus Working Example shows the improved result by 1.2% AI.

In addition, as shown in FIG. 6, average transmission noise on acceleration (% AI) at a passenger seat is 66.5% AI in working example and is 64.3% AI in Comparative Example in an RPM range interval ranging from 2,000 to 3,800 rpm, and thus Working Example shows the improved result by 2.2% AI.

Figure 7:
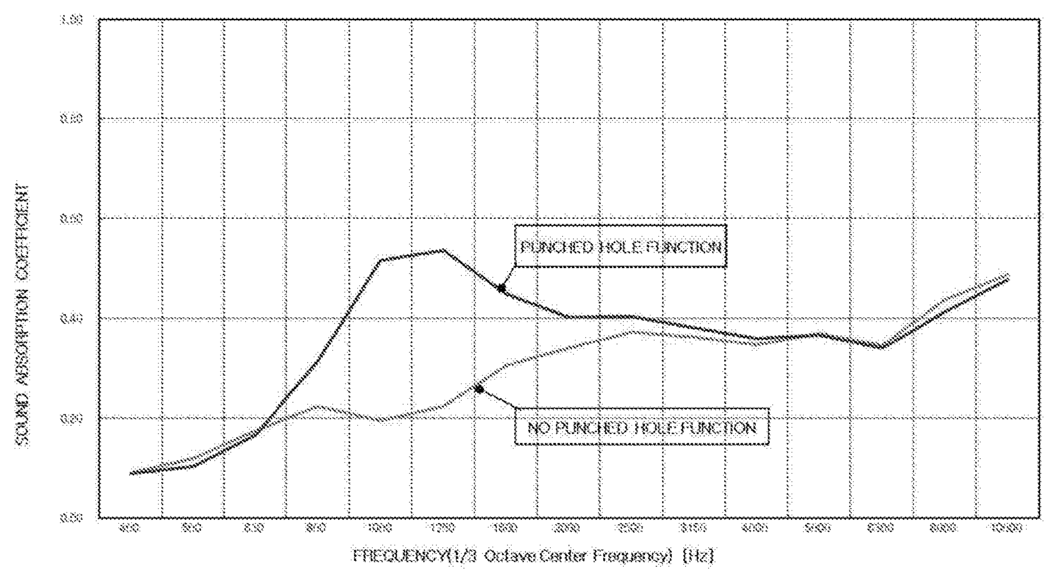
FIG. 7 is a graph for showing a sound absorption coefficient of the load floor manufactured according to the present invention depending on a frequency, a blue line is obtained using the load floor in which punched holes are formed in one polyurethane foam of two polyurethane sheets, and a green line is obtained using the load floor in which punched holes are not formed.

In addition, when sound absorption coefficients of cases in which punched holes are formed and are not formed in load floors are compared, a sound absorption performance is better at middle and high frequency bands when the punched holes are formed in a polyurethane sheet in the load floor as illustrated in FIG. 7. In FIG. 7, a horizontal axis represents a frequency (one third octave center frequency) and a vertical axis represents the sound absorption coefficient. In addition, a blue line represents an absorption coefficient of the load floor in which the punched holes are formed in one of two polyurethane sheets included in the load floor according to the present invention, and a green line represents an absorption coefficient of the load floor in which the punched holes are not formed in polyurethane sheets in the load floor according to the present invention. In addition, the size of a load floor sample is 1,200×800 mm$^2$ in which five punched holes having a diameter of 2 mm are formed per 100 mm. The total number of formed punched holes is 2,400, i.e., 60×40=2,400.

Accordingly, it may be recognized that transmission noise on acceleration (% AI) of the load floor according to the present invention is improved as compared to the conventional load floor manufactured with the conventional PP.

As described above, a load floor for a vehicle according to the present invention having sound absorption and insulation performances provides the following effects.

(1) A load floor that is light and has sufficient structural stiffness can be manufactured using a honeycomb structure.

(2) Particularly, since the honeycomb structure is manufactured with paper, a manufacturing cost is low, and structural stiffness and a sound absorption performance can be improved.

(3) In addition, since a polyurethane sheet is disposed on each of both side surfaces of the honeycomb structure, a noise performance is improved by such a honeycomb structure and a sound absorption performance may be further improved through the polyurethane sheet.

(4) Moreover, since a plurality of punched holes are formed in one of the polyurethane sheets, a sound insulation effect for outside noise that comes into a trunk from the outside of a vehicle may be obtained by the polyurethane sheet in which the punched holes are not formed, and a sound absorption effect for such noise may be obtained by the polyurethane sheet in which the punched holes are formed, and thus pleasant indoor environment can be provided.

(5) Particularly, the load board can be manufactured to obtain an optimum noise reduction effect for a model of the vehicle by punching holes in the polyurethane sheet to have a diameter corresponding to a specific band of noise that is transmitted to the trunk according to the model of the vehicle since a band of noise that passes through the punched holes is different according to the diameter of the punched holes.

(6) Such punched holes can be manufactured and used for different noise reduction positions and noise frequency bands according to a diameter, the number, and forming positions thereof.

(7) In addition, the load floor according to the present invention has excellent dimensional stability and formability.

(8) Finally, the load floor according to the present invention includes a package tray used by being laid on a floor panel of the trunk or installed to be spaced a predetermined height from a bottom of the trunk, and thus can have a structural stiffness enough to tolerate the weight of luggage even when the luggage is put on the package tray.

REFERENCE NUMERALS

10: HONEYCOMB STRUCTURE
20: GLASS MESH MAT
30: POLYURETHANE SHEET
40: WALL PAPER

What is claimed is:

1. A load floor having sound absorption and insulation performances for a vehicle, comprising:

a honeycomb structure manufactured in a sheet form;

two glass mesh mats respectively installed on both side surfaces of the honeycomb structure;

polyurethane sheets formed of a hard material and respectively provided to overlap the glass mesh mats, wherein at least one of the polyurethane sheets comprises punched holes having a predetermined gap; and two wall papers respectively provided to overlap the polyurethane sheets.

2. The load floor of claim 1, wherein the honeycomb structure is manufactured with paper.

3. The load floor of claim 1, wherein, in a plan view, the honeycomb structure is formed in a shape in which a corrugating medium is integrally formed with regular hexagonal pillars, polygonal pillars, regular polygonal pillars, or liners into which the corrugating medium is inserted.

4. The load floor of claim 1, wherein the punched holes have a diameter in a range of 2 to 4 mm.

5. The load floor of claim 1, wherein:

the load floor has a total thickness in a range of 13 to 25 mm; and each of the polyurethane sheets has a thickness in a range of 2 to 3 mm.

6. The load floor of claim 5, wherein the load floor is used by being installed on a trunk floor panel or includes a package tray installed to be spaced a predetermined gap from the floor panel and configured to put luggage thereon.

* * * * *